Patented Feb. 17, 1925.

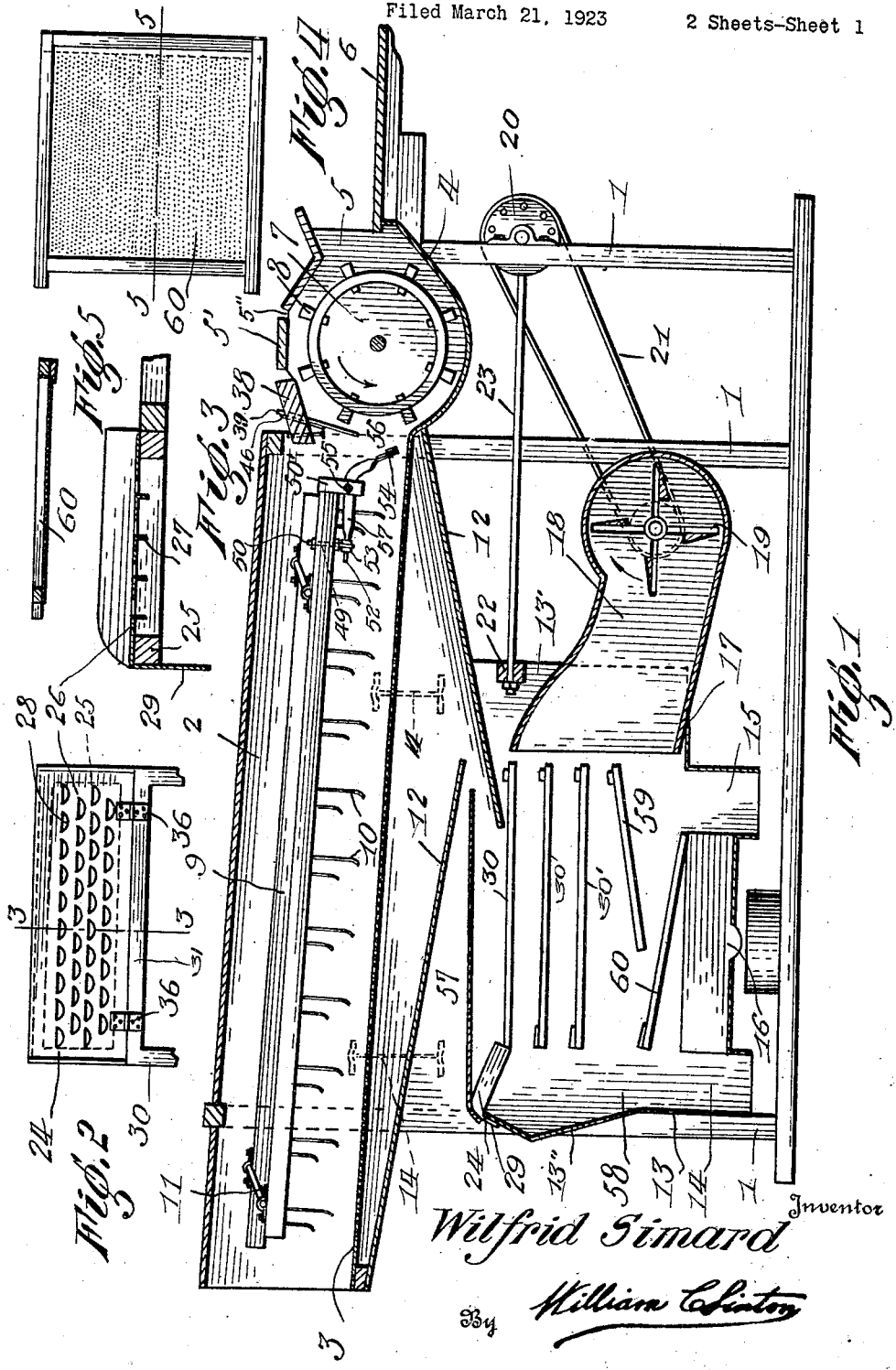

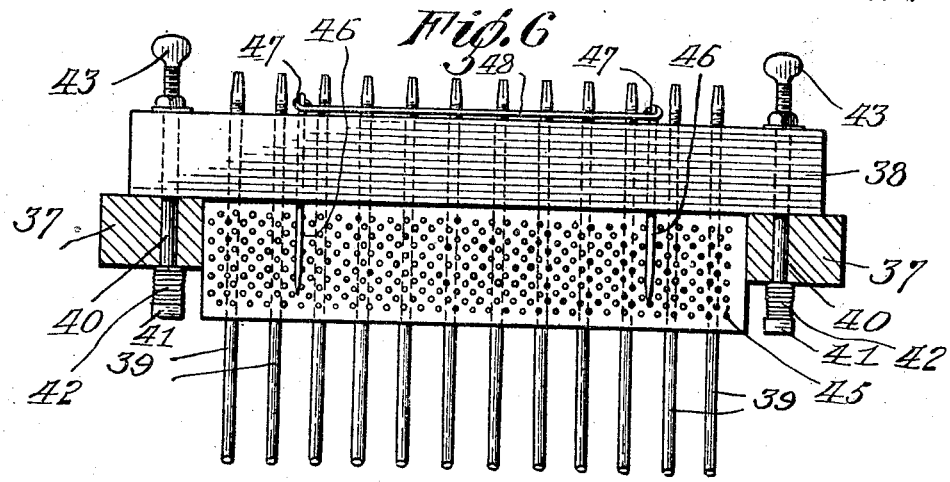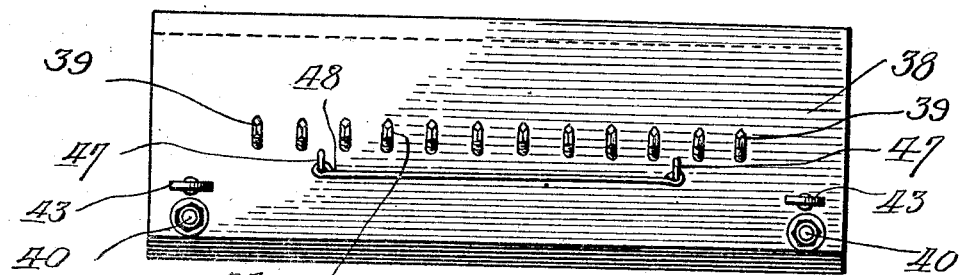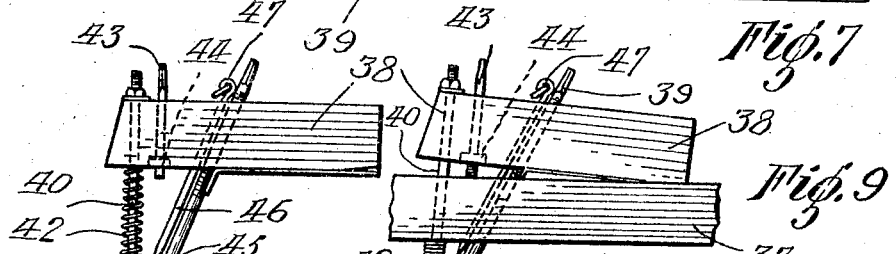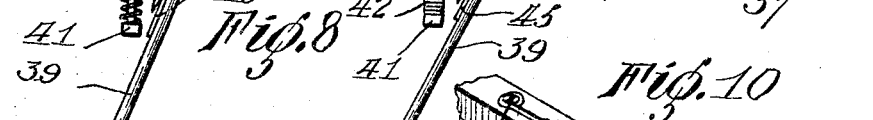

1,527,090

UNITED STATES PATENT OFFICE.

WILFRID SIMARD, OF ST. URBAIN, QUEBEC, CANADA.

THRASHING MACHINE.

Application filed March 21, 1923. Serial No. 626,626.

*To all whom it may concern:*

Be it known that I, WILFRID SIMARD, subject of the King of Great Britain, residing at St. Urbain, county of Charlevoix, Province of Quebec, Canada, have invented certain new and useful Improvements in Thrashing Machines, and I do hereby declare that the following is a full, clear, and exact description of the invention, such as will enable others skilled in the art to which it appertains to make and use the same.

The present invention relates to new and useful improvements in thrashing machines.

In thrashing machines of smaller sizes it has been found to be impossible to beat and to sift the grain from the cluster. Machines of this character can grip only heavy grains such as wheat, corn, barley, oats and peas. The object of this invention is primarily the provision of an attachment which may be applied to machines of the above mentioned type for enabling them to beat in a satisfactory manner light grains as well as the heavier ones. The device designed to bring about this result consists of a comb supported by the frame of the machine in parallel relation with the beating cylinder and disposed between the cylinder and the forward end of the carrier. The comb is preferably inclined and is disposed in such proximity to the cylinder as to permit a subsequent thrashing between it and the cylinder, the inclination of the comb being adjustable to accommodate various grades of material.

The invention further includes a scraper blade attached to the forward end of the carrier for pulling the thrashed material to the rear of the machine through a conduit the base of which is a screen adapted to allow the passage of the grain therethrough. The stalks are subsequently expelled through the rear end.

The invention is fully disclosed in the following description and in the accompanying drawings in which:

Figure 1 is a vertical longitudinal section of the machine;

Figure 2 is a plan view of one of the riddles;

Figure 3 is a section on the line 3—3 of Figure 2;

Figure 4 is a plan of the lowermost screen;

Figure 5 is a section on the line 5—5 of Figure 4;

Figure 6 is a front elevation of the comb device;

Figure 7 is a plan view thereof;

Figure 8 is a detail view of the adjustable comb carrier;

Figure 9 is a similar view showing the comb carrier applied to the frame of the machine;

Figure 10 is a detail perspective view of one of the frames;

Figure 11 is a detail horizontal section showing the screen frame inserted in the machine prior to locking; and Figure 12 is a similar view showing the screen frame locked in position in the walls of the machine.

Throughout these views like reference characters are employed to designate corresponding parts. A plurality of uprights 1 serve to support a conduit 2 the bottom of which consists of a screen 3 and the ends of which are open. At one end of the conduit is mounted a concave 4 which is received between the side walls 5 of the conduit, the concave communicating with a feed board 6. Above the concave is mounted a beating cylinder 7 which is journalled in the side walls 5 and is provided with longitudinal ribs 8. Within the conduit 2 is disposed a pair of carriers each of which includes a body 9 having a plurality of vertical hooked prongs 10 extending downwardly therefrom. The body members are supported on cranks 11 journalled in the side walls 5 and turned by any suitable mechanism. A pair of slides 12 are supported beneath the screen 3 and slope downwardly in a convergent manner, the ends thereof overlapping, as shown in Figure 1. A casing 13 is suspended beneath the conduit 2, being suspended from the side walls thereof by means of the pivot links 14. Opposite sides of the casing are formed with outlets 14 and 15, while an intermediate outlet 16 is formed in the bottom. A corner 17 of the casing is open for the reception of a stationary funnel 18 in which is mounted a fan 19. The fan is driven from a pulley 20 by means of a belt 21. The sides 13' of the casing 13 serve to support a cross strip 22 which is connected to the pulley by means of a pitman 23, whereby an oscillatory movement is imparted to the casing. The portion of the top wall of the casing above the outlet portion is open and fitted with a riddle designated by the numeral 24. This member consists of a rectangular frame 25 to which is secured a piece of metal 26 and of which are stamped the depending semi-elliptical sections 27 which form the perforations 28. An edge of the sheet 26 is bent downwardly to form a lip 29 (Fig. 1) for engaging the rear wall 13″ of the casing 13. A plurality of sifting devices 30 and 30′ each including a frame 31 are mounted in the casing 13. The corners of the frame are equipped with spring toothed members 32 composed of wire having an end wound around a stud 33 to give the spring effect. When the frames are to be inserted in the machine, they are entered through the open corner 17, the members 32 engaging the inner faces of the walls 13′ shown in Figure 11. These faces are formed with notches 34 adapted to receive the toothed members 32. The latter enter the notches as a result of which the frames are locked in position as shown in Figure 12. The free ends of the wires are bent downwardly as at 35 to form finger grips. When it is desired to remove the frame, the finger grips 35 are pulled outwardly so that the toothed members 32 are removed from the notches. It will be noted from Figure 2 that the frame 25 is provided with hinges 36 by means of which it is attached to the upper frame 31.

Above the concave 4 is disposed a pair of strips 37 which extend transversely over the ends of the drum 7. These strips are shown in section in Figure 6 and in side elevation in Figure 9. On these strips is supported a transverse plate 38 through which are passed a plurality of parallel and inclined needles 39 extending through the space between the two strips 37. Bolts 40 are passed through the ends of the plate and through the strips 37 and are provided at their lower ends with collars 41 and expansion springs 42 bearing against the under faces of the strips 37, whereby the plate 38 is normally pulled downwardly towards the strips. For adjusting the angle between the plate 38 and consequently the inclination of the needles 39, a pair of screws 43 are passed through the ends of the plate 38 adjacent the bolts 40. These screws are threaded through nuts 44 fixed in the under face of the plate. A perforated plate or screen 45 engages the intermediate portions of the comb elements 39 beneath the plate 38, and is held in place by means of a pair of pins 46 passed through the plate in close proximity to the members 39. The heads 47 of the pins are connected by a link 48 by means of which they can be readily withdrawn.

In the forward end of one of the members 9 is formed a hole 49 (Fig. 1) for the adjustment of a screw threaded bolt 50. The extreme forward end of the aforesaid member 9 carries a yoke 50′ to which is secured the intermediate portion of a bent arm 51. The rear end of this arm is threaded as at 52, this end being passed through the lower end of the bolt 50 and adapted to be locked in adjusted positions by means of the nuts 53. The lower or forward end of the bent arm 51 carries a blade 54 the function of which is pointed out below. It will be apparent that the height of the blade can be adjusted by means of the bolt 50 and nuts 53, the arm swinging on the axis 55.

The operation of the device is as follows: The hay is placed on the feed board 6 and by the movement of the beating cylinder 7 is carried inwardly and thrashed against planks 5′ disposed above the cylinder. The spaces between the planks are closed by plates 5″ of suitable material. The comb or rake 38—39 at the rear of the cylinder completes the thrashing and prevents the stalks from passing into the conduit 2 and retains them in the space indicated by the numeral 56. The members 9 are oscillated by means of the cranks 11 in a manner well known in the art so that the blade 54 engages the straw and carries it rearwardly to the opposite end of the conduit. The grain which is mixed with the straw is sifted through the screen 3 and falls upon the inclined slides 12 from which it travels to the first or upper screen 30. This grain coming from the space 56 is mixed with dirt and other impurities. Because of the blast created by the fan 19 the husk is driven through the rear of the machine and passes through an outlet 57 in the path of the casing 13, and across the riddle 26. The grain which is not stripped passes through the perforations 28 and into the reservoir 58 leading to the outlet 14. On the other hand, the grain which has been stripped passes through the upper screen 30 and through the lower one 30′ to the inclined plate 59 to be finally transferred to the last inclined screen 60. The fineness of the screens increases from top to bottom so that the number of perforations per unit of area is inversely proportional to the altitude of a particular screen. In the event that certain irregular grains are introduced through the upper screen 30, the draft will force them to the reservoir 58, and this action also applies to the irregular grains on the lower screen 30′. Finally, the inclined plate 24 ensures the separation of the fine grain from the coarser material. The fine grain after having reached the inclined screen 60 passes therethrough and to the outlet 16, while the remainder gravitates to the outlet 15.

The perforated plate 45, held against the comb 38—39 by means of the pins 46, prevent the passage of too large a quantity of hay through the rake and also the passage of hay to the upper part of the members 9, the perforations assuring proper ventilation at this area. The blade 54 now carries the material to the conduit 2 where the separation commences.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. In a thrashing machine, a beating cylinder, a pair of spaced stationary strips disposed above the ends of said cylinder, a plate supported by said strips, and needles carried by said plate and extending adjacent the cylinder.

2. In a thrashing machine, a beating cylinder, a pair of spaced stationary strips disposed above the ends of said cylinder, a plate supported by said strips, and inclined needles carried by said plate and extending adjacent the cylinder.

3. In a thrashing machine, a beating cylinder, a pair of spaced stationary strips disposed above the ends of said cylinder, a plate supported by said strips, inclined needles carried by said plate and extending adjacent the cylinder, and means for varying the angular relation between said plate and strips.

4. In a thrashing machine, a beating cylinder, a comb disposed adjacent said cylinder, and a perforated plate extending across the intermediate portion of said comb.

5. In a thrashing machine, a beating cylinder, a pair of spaced stationary strips extending across the ends of said cylinder, a plate supported by said strips, needles carried by said plate and extending adjacent the cylinder, and screws threaded through said plate and bearing on the strips.

6. In a thrashing machine, a beating cylinder, a pair of spaced stationary strips extending across the ends of said cylinder, a plate supported by said strips, needles carried by said plate and extending adjacent the cylinder, screws threaded through said plate and bearing on the strips, bolts passed through said plate and strips, collars formed at the lower ends of the bolts, and springs surrounding said bolts, said springs bearing against said collars and the lower faces of said strips.

7. In a thrashing machine including a beating cylinder and a carrier, a blade carried by the forward end of said carrier, and means varying the altitude of said blade.

8. In a thrashing machine including a beating cylinder and a carrier, a bent arm having its intermediate portion supported at the forward end of said carrier, a threaded bolt passed through the body of said carrier, the rear end of said arm being threaded and passed through said bolt, nuts on said threaded end and opposite sides of said bolt, and a blade carried by the other end of said arm.

9. In a thrashing machine including a beating cylinder and a carrier adjacent the cylinder, a blade carried by the forward end of said carrier for moving the thrashing material away from the cylinder, and a comb disposed between said blade and cylinder for permitting further thrashing between the comb and the cylinder and for holding the stalks away from the blade.

10. In a thrashing machine including a beating cylinder and a carrier, a blade carried by the forward end of said carrier, a comb disposed between said blade and cylinder for permitting further thrashing between the comb and the cylinder and for holding the stalks away from the blade, and a perforated sheet extending across the intermediate portion of said comb.

11. In a thrashing machine including a beating cylinder and a carrier, a blade carried by the forward end of said carrier, a comb disposed between said blade and cylinder for permitting further thrashing between the comb and the cylinder and for holding the stalks away from the blade, and means for varying the altitude of said blade.

12. In a thrashing machine including a beating cylinder and a carrier, a blade carried by the forward end of said carrier, an inclined comb disposed between said cylinder and blade for permitting further thrashing between the comb and the cylinder and for holding the stalks away from the blade, and means for varying the inclination of said comb.

13. In a thrashing machine including a beating cylinder and a carrier, a blade carried by the forward end of said carrier, an inclined comb disposed between said cylinder and blade for permitting further thrashing between the comb and the cylinder and for holding the stalks away from the blade, means for varying the inclination of said comb, and means for varying the altitude of said blade.

In witness whereof I have hereunto set my hand.

WILFRID SIMARD.